United States Patent
Park et al.

(10) Patent No.: US 9,867,051 B2
(45) Date of Patent: Jan. 9, 2018

(54) SYSTEM AND METHOD OF VERIFYING INTEGRITY OF SOFTWARE

(71) Applicant: Electronics and Telecommunications Research Institute, Daejeon (KR)

(72) Inventors: Su Wan Park, Daejeon (KR); Geon Lyang Kim, Daejeon (KR); Kyung Soo Lim, Daejeon (KR); Jae Deok Lim, Daejeon (KR); Jeong Nyeo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 174 days.

(21) Appl. No.: 14/663,110

(22) Filed: Mar. 19, 2015

(65) Prior Publication Data

US 2015/0271679 A1    Sep. 24, 2015

(30) Foreign Application Priority Data

Mar. 19, 2014    (KR) ........................ 10-2014-0032329

(51) Int. Cl.
*G06F 21/00*    (2013.01)
*H04W 12/10*    (2009.01)
(Continued)

(52) U.S. Cl.
CPC ............. *H04W 12/10* (2013.01); *G06F 21/10* (2013.01); *G06F 21/64* (2013.01); *H04L 63/123* (2013.01);
(Continued)

(58) Field of Classification Search
CPC ........ G06F 21/10; G06F 21/64; H04W 12/10; H04W 12/12
See application file for complete search history.

(56) References Cited

U.S. PATENT DOCUMENTS 5,944,821 A * 8/1999 Angelo ................... G06F 21/51
726/22
2004/0111618 A1 * 6/2004 Vaha-Sipila ............ G06F 21/51
713/176

(Continued)

FOREIGN PATENT DOCUMENTS

KR    10-2013-0125245 A    11/2013

OTHER PUBLICATIONS

Sagar Chaki et al., Modular Verification of Software Components in C, Aug. 9, 2004, IEEE, vol. 30, No. 6, pp. 388-402.*

(Continued)

*Primary Examiner* — Luu Pham
*Assistant Examiner* — Fahimeh Mohammadi

(57) ABSTRACT

A system and method of verifying integrity of software for verifying the integrity of software installed on a mobile terminal is provided. The system includes the mobile terminal configured to transmit mobile terminal information including a first software hash value and a software identification (ID) with respect to the software, and an office trust software monitor server configured to transmit the software ID transmitted from the mobile terminal to a software publishing server, receive a second software hash value with respect to the software corresponding to the software ID from the software publishing server, compare the first software hash value and the second software hash value, and verify the integrity of the software.

12 Claims, 10 Drawing Sheets

(51) Int. Cl.
*G06F 21/10* (2013.01)
*G06F 21/64* (2013.01)
*H04L 29/06* (2006.01)
*H04W 4/00* (2009.01)
*H04W 12/12* (2009.01)

(52) U.S. Cl.
CPC .......... *H04W 4/001* (2013.01); *H04W 4/003* (2013.01); *H04W 12/12* (2013.01)

(56) References Cited

U.S. PATENT DOCUMENTS

| | | | | |
|---|---|---|---|---|
| 2005/0120209 A1* | 6/2005 | Kwon | .................... | H04W 8/245 713/161 |
| 2005/0268343 A1* | 12/2005 | Onoda | .................. | G06F 21/105 726/26 |
| 2009/0157716 A1 | 6/2009 | Kim et al. | | |
| 2009/0193522 A1* | 7/2009 | Ishikawa | ................. | G06F 21/57 726/22 |
| 2009/0265756 A1* | 10/2009 | Zhang | ..................... | G06F 21/53 726/1 |
| 2010/0058468 A1* | 3/2010 | Green | ..................... | G06F 21/51 726/22 |
| 2010/0287547 A1* | 11/2010 | Korkishko | .............. | G06F 21/57 717/177 |
| 2011/0138188 A1* | 6/2011 | Lee | ......................... | G06F 21/57 713/187 |
| 2013/0275590 A1* | 10/2013 | Wong | ..................... | H04L 63/10 709/225 |
| 2014/0007229 A1* | 1/2014 | Smith | .................... | G06F 21/564 726/22 |
| 2014/0096246 A1* | 4/2014 | Morrissey | ............... | G06F 21/51 726/23 |
| 2014/0325644 A1* | 10/2014 | Oberg | ..................... | G06F 21/51 726/22 |

OTHER PUBLICATIONS

Taejoon Park et al. Soft Tamper-Proofing via Program Integrity Verification in Wireless Sensor Networks, May-Jun. 2005, IEEE, vol. 4, No. 3, pp. 297-309.*
Darko Kirovski et al., Enabling Trusted Software Integrity, Dec. 2002, ACM, vol. 30 Issue 5, pp. 108-120.*
Reiner Sailer et al., Attestation-based Policy Enforcement for Remote Access, Oct. 25-29, 2004, ACM, pp. 308-317.*

* cited by examiner

130

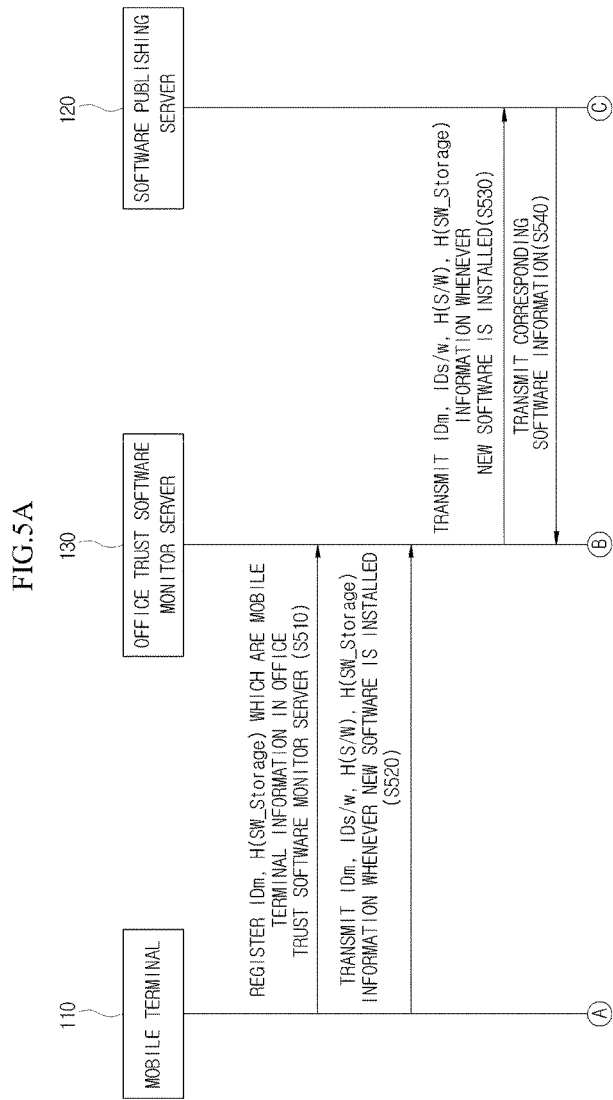

SYSTEM AND METHOD OF VERIFYING INTEGRITY OF SOFTWARE

CROSS-REFERENCE TO RELATED APPLICATION

This application claims priority to and the benefit of Korean Patent Application No. 10-2014-0032329, filed on Mar. 19, 2014, the disclosure of which is incorporated herein by reference in its entirety.

BACKGROUND

1. Field of the Invention

The present invention relates to technology of verifying integrity of software, and more particularly, to a system and method of verifying integrity of software installed on a mobile terminal.

2. Discussion of Related Art

Recently, a wireless Internet is being used regardless of time and place according to spread of utilization of a mobile terminal such as a smart phone, and environment of a conventional Internet site is also being changed as environment of the mobile terminal is changed. Accordingly, an Internet service provided in personal computer (PC) environment is being provided in mobile terminal environment, and it is anticipated that security threats of the PC environment will be appeared in the mobile terminal environment. Particularly, since the mobile terminal is always being turned on and is able to connect to a network anytime and anywhere, the mobile terminal is very vulnerable to security threats because an attacker can attack anytime when the attacker has a mind.

As described above, as the security threats to various mobile terminals are increased, a solution thereof is being developed in various aspects. Most of methods against the security threats to the mobile terminals are implemented by software. However, a software security method has a problem in which private data stored in a memory is leaked when the memory in which the private data of a user is stored is lost or the private data is maliciously hacked from the outside.

In order to solve the problem, enterprises, etc. which desire to implement mobile office environment should use a mobile vaccine for treating malicious codes, and should also have security solutions against various security threats. Accordingly, a mobile device management (MDM) solution which is an enterprise type mobile terminal management service capable of applying differently by defining an information technology (IT) policy with respect to each department and each person started to be introduced.

Since the mobile terminal uses a wireless communication network in which anyone can access in the outside of the enterprise, the MDM solution basically provides a function such as encryption and strong authentication, etc. for preventing a man-in-the-middle attack. Further, the MDM solution should immediately distribute a security application and a security policy regardless of a location of a smart device of the user including the mobile terminal in order to maximize the security of the mobile office environment.

Meanwhile, since a requirement for not only simple device management but also application management is increased in order to solve the security threats concerned as a personal smart device is used in business, the MDM solution is being evolved into a mobile application management (MAM) solution. Accordingly, the enterprise can monitor usage and status of applications of mobile terminals in the enterprise according to the security policy such as the MDM solution or the MAM solution, and protect enterprise data. Further, in order to solve the security threats to enterprise data which is developing day by day, more strong security methods are required.

SUMMARY OF THE INVENTION

The present invention is directed to a system and method of verifying integrity of software capable of installing only authenticated software in mobile terminals by verifying the software when the mobile terminals of a specific group install, update, or delete the software.

According to one aspect of the present invention, there is provided a system of verifying integrity of software installed on a mobile terminal, including: the mobile terminal configured to transmit mobile terminal information including a first software hash value and a software identification (ID) with respect to the software; and an office trust software monitor server configured to transmit the software ID transmitted from the mobile terminal to a software publishing server, receive a second software hash value with respect to the software corresponding to the software ID from the software publishing server, compare the first software hash value and the second software hash value, and verify the integrity of the software.

Here, the office trust software monitor server may include: a communication unit configured to receive the mobile terminal information from the mobile terminal, and transmit the result of the integrity verification to the mobile terminal; a comparison unit configured to compare the first software hash value and the second software hash value received through the communication unit; and a generation unit configured to generate alarm information with respect to the result of the integrity verification according to the comparison result of the comparison unit.

The generation unit may determine that the integrity verification of the software is succeeded when the first software hash value and the second software hash value are the same according to the comparison result of the comparison unit, determine that the integrity verification of the software is failed when the first software hash value and the second software hash value are not the same, selectively generate verification success alarm information or verification failure alarm information according to the result of the integrity verification, and transmit the verification success alarm information or the verification failure alarm information to the mobile terminal through the communication unit.

The office trust software monitor server may further include: a storage unit configured to store the result of the integrity verification and the mobile terminal information when the integrity verification of the software is succeeded.

The mobile terminal may perform a security policy including at least one of an operation of deleting the software and an operation of limiting access to a memory by the software when the verification failure alarm information is received.

The mobile terminal may include a memory divided into a software installation region in which a data value is not changed and a user data region in which the data value is changed.

The mobile terminal information may further include an initial hash value with respect to the software installation region which is a value obtained by applying a hash function to data of an initial state of the software installation region, and an ID of the mobile terminal.

The system of verifying the integrity of the software may further include: a smart trust software monitor server configured to compare a first initial hash value with respect to the software installation region which is previously received from the office trust software monitor server and is previously stored and a second initial hash value with respect to the software installation region which is received from the mobile terminal at a specific time, and verify the integrity of the mobile terminal.

The smart trust software monitor server may include: a communication unit configured to repeatedly receive the mobile terminal information from the office trust software monitor server and an ID of the office trust software monitor server; a data management unit configured to update the previously stored mobile terminal information using the mobile terminal information received from the office trust software monitor server through the communication unit, and request the integrity verification of the software at the specific time; a comparison unit configured to compare the second initial hash value with respect to the software installation region received from the mobile terminal and the first initial hash value which is previously stored according to the request of the integrity verification of the software; and a generation unit configured to generate alarm information with respect to the result of the integrity verification according to the comparison result of the comparison unit.

The generation unit may determine that the integrity verification of the software is succeeded when the first initial hash value and the second initial hash value are the same according to the comparison result of the comparison unit, determine that the integrity verification of the software is failed when the first initial hash value and the second initial hash value are not the same, selectively generate verification success alarm information or verification failure alarm information according to the result of the integrity verification, and transmit the verification success alarm information or the verification failure alarm information to the mobile terminal through the communication unit.

The mobile terminal may perform a security policy including at least one of an operation of deleting the software and an operation of limiting access to a memory by the software when the verification failure alarm information is received.

According to another aspect of the present invention, there is provided a method of verifying integrity of software installed on a mobile terminal by an office trust software monitor server, the method including: receiving mobile terminal information including a first software hash value and a software identification (ID) with respect to the software from the mobile terminal; transmitting the software ID received from the mobile terminal to a software publishing server; receiving a second software hash value with respect to the software corresponding to the software ID from the software publishing server; and comparing the first software hash value and the second software hash value and verifying the integrity of the software.

The verifying of the integrity may include: generating alarm information according to the comparison result of the first software hash value and the second software hash value; and transmitting the generated alarm information to the mobile terminal.

The generating of the alarm information may determine that the integrity verification of the software is succeeded when the first software hash value and the second software hash value are the same according to the comparison result and generate verification success alarm information, and determine that the integrity verification of the software is failed when the first software hash value and the second software hash value are not the same and generate verification failure alarm information.

The method of verifying the integrity of the software may further include: storing the result of the integrity verification and the mobile terminal information when the integrity verification of the software is succeeded.

According to still another aspect of the present invention, there is provided a method of verifying integrity of software installed on a mobile terminal by a smart trust software monitor server, the method including: receiving mobile terminal information including a first initial hash value which is a value obtained by applying a hash function to data of an initial state of a software installation region of the mobile terminal and an identification (ID) of an office trust software monitor server from the office trust software monitor server; updating the mobile terminal information which is previously stored using the mobile terminal information which is repeatedly received from the office trust software monitor server; requesting integrity verification of the software at a specific time; receiving a second initial hash value with respect to the software installation region from the mobile terminal according to the request of the integrity verification of the software; and comparing the first initial hash value and the second initial hash value and verifying the integrity of the software.

The verifying of the integrity may include: generating alarm information according to the comparison result of the first initial hash value and the second initial hash value; and transmitting the generated alarm information to the mobile terminal.

The generating of the alarm information may determine that the integrity verification of the software is succeeded when the first initial hash value and the second initial hash value are the same and generate verification success alarm information, and determine that the integrity verification of the software is failed when the first initial hash value and the second initial hash value are not the same and generate verification failure alarm information.

The method of verifying the integrity of the software may further include: storing the result of the integrity verification and the mobile terminal information when the integrity verification of the software is succeeded.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 5A and 5B are a flowchart for describing a method of verifying integrity of software in an office trust software monitor server according to an embodiment of the present invention;

DETAILED DESCRIPTION OF EXEMPLARY EMBODIMENTS

Figure 1:
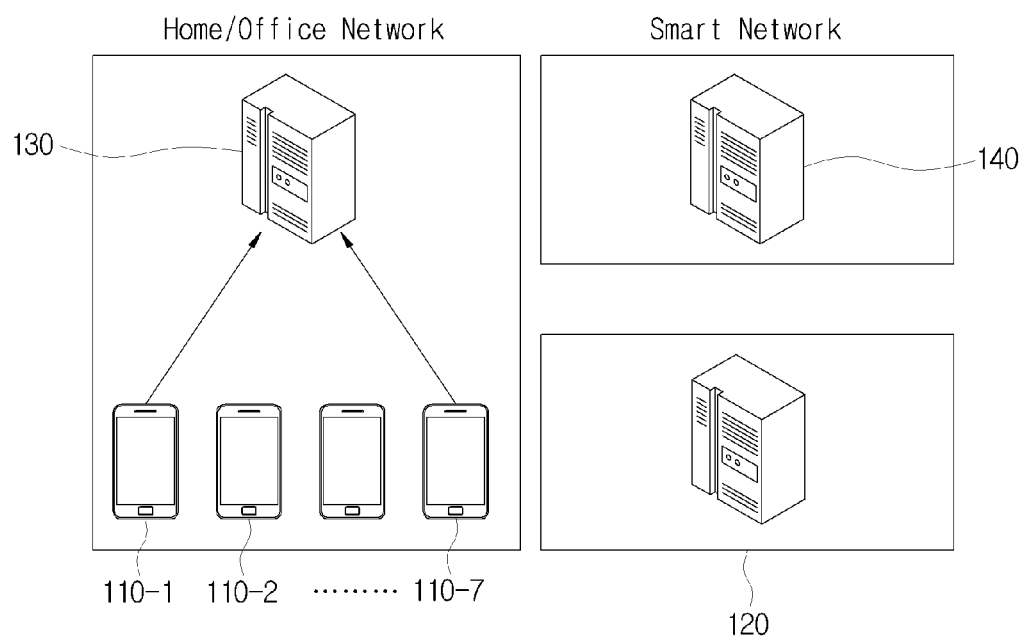
FIG. 1 is a diagram illustrating a system of verifying integrity of software of mobile terminals according to an embodiment of the present invention.

Hereinafter, exemplary embodiments of the present invention will be described in detail below with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, but the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, embodiments of the present invention will be described in detail with reference to accompanying drawings. First of all, like reference numerals represent like components although shown in other drawings when assigning reference numerals in the components of each drawing. Further, when detailed description of known configurations or functions obscures the subject matter of the present invention, detailed description thereof will be omitted.

Before describing the present invention, the meaning of terms used in the specification will be simply described. The description of the terms is for helping understanding of the specification, and when the terms are not used in order to limit the present invention definitely, it should be noted that the terms are not used for limiting the technical scope of the present invention.

Integrity

Integrity may be used as the meaning of precision, accuracy, completeness, and validation, and mean to secure accuracy of data. For example, data integrity may protect data, and mean to maintain normal data always. Further, the integrity may be related to a capability of preventing data change due to an unauthenticated or unwanted method.

Certificate

A certificate may mean to authenticate a public key to users with respect to a public key encryption in an authorized authority such as a certification authority. The certificate may mean a message in which identity and a private key of a specific subscriber is signed as the public key of the certification authority. Accordingly, when applying the public key of the certification authority to the certificate, since the integrity of the certificate is easily checked, a problem in which the public key of the specific user is arbitrarily changed by an attacker is prevented.

Software Monitor

A software monitor may be one of software tools, and may be a program of providing detailed information with respect to execution of the program by being executed together with another program.

Software Identification (IDs/w) A software identification (ID) may mean a specific identification value (symbol) assigned to each software in an information communication network shared by many people and a mobile terminal.

Software Hash Value (H(S/W))

A software hash value may be a hash value generated using a hash function in order to verify authentication and integrity of software installed on a mobile terminal, and be used in a security protocol.

Initial Hash Value with Respect to a Software Installation Region H(SW_Storage)

An initial hash value with respect to a software installation region may be a value obtained by applying a hash function to data of a memory region in which data is not changed in a mobile terminal released by a system manager (an enterprise), and include a value obtained by applying the hash function to data of an initial state of the software installation region. That is, the initial hash value with respect to the software installation region (H(SW_storage)) may be a value obtained by encrypting the initial state of the software installation region of a memory included in each mobile terminal.

The initial hash value with respect to the software installation region (H(SW_storage)) according to the present invention may be compared with a hash value after the software installation and a hash value of the software installation region which is previously stored, and be used for performing the integrity verification of the software.

Time Stamp

A time stamp may be electronic technology of verifying that an electronic document exists at a specific time and also data is not changed after the specific time as public key infrastructure (PKI)-based international standard technology for electronic document creation time confirmation (existence proof) and authenticity confirmation (forgery verification).

Random Value

A random value may mean a number or string having randomness, and actually, since a high cost is required in order to generate a complete random number, a pseudo-random number may be used. In an embodiment of the present invention, the random value may be used as a password for authenticating a communication time and transmitted and received data in communication between a server and a mobile terminal.

Meanwhile, the meaning of installation described in the specification may include installation, update, and deletion of the software. That is, the integrity verification of the software installed on the mobile terminal may be performed in one or more of the software installation operation, the software update operation, and the software deletion operation.

Hereinafter, a system of verifying integrity of software according to an embodiment of the present invention which will be described below can eliminate security threats of a mobile terminal and provide a more safe mobile service environment to a user by the use of legal software when the software is changed, or even when the software is changed in a centralized mobile management system such as a mobile device management (MDM) or a home domain, an office domain by performing authentication and the integrity verification of the software using an initial hash value with respect to a software installation region of a memory of the mobile terminal.

For this, the system of verifying the integrity of the software according to an embodiment of the present invention may store a value obtained by applying a hash function to data of a memory initial state of the software installation region of the mobile terminal, and perform the authentication and the integrity verification of the software installed on the mobile terminal using a method of comparing the stored value obtained by applying the hash function to the data of the memory initial state of the software installation region (an initial hash value H(SW_Storage)) and the initial hash value with respect to the software installation region of the memory of the mobile terminal after the software are installed. Here, the value obtained by applying the hash function to the data of the memory initial state of the software installation region may be stored in a smart trust software monitor server.

The system of verifying the integrity of the software according to an embodiment of the present invention may perform the authentication and the integrity verification of the software based on software installation information which is recorded and is not changed in the software installation region of the memory of the mobile terminal.

For this, the system of verifying the integrity of the software which manages mobile terminals including the memory in which the software installation region is allocated may be implemented as shown in FIG. 1. FIG. 1 is a diagram illustrating a system of verifying integrity of software of mobile terminals according to an embodiment of the present invention.

As shown in FIG. 1, the system of verifying the integrity of the software 100 according to an embodiment of the present invention may include one or more mobile terminals 110-1 to 110-n, a software publishing server (SPS) 120, an office trust software monitor server (OTSMS) 130, and a smart trust software monitor server (STSMS) 140.

Each of the mobile terminals 110-1 to 110-n may be implemented in a form capable of driving and executing a variety of software itself. Representatively, each of the mobile terminals 110-1 to 110-n may be implemented as a smart phone, but is not limited thereto as described above. Further, for convenience of explanation, hereinafter, an example of verifying of the integrity of the software installed on any one mobile terminal 110 of the mobile terminals 110-1 to 110-n will be described.

The mobile terminal 110 may be transmit and receive various data by communicating with the office trust software monitor server 130 and the smart trust software monitor server 140, respectively, through a network. For example, the mobile terminal 110 may perform communication with the office trust software monitor server 130 and the smart trust software monitor server 140 using wireless fidelity (Wi-Fi), but is not limited thereto.

The software publishing server 120 may manage software in which installation is allowed by a system manager, and provide software of which installation is allowed to the office trust software monitor server 130 or the mobile terminal 110. At this time, the software of which the installation is allowed may be installed through an application (App) store provided from the system manager (for example, enterprise). Further, the software of which the installation is allowed may be software obtaining authentication (for example, a license, a certificate, etc.) from the system manager. The software provided by the system manage may be installed through the software publishing server 120 which is a separate server.

The office trust software monitor server 130 may mean a software monitor capable of controlling a local area such as a user, home, office, etc. Here, the software monitor may be a program of providing detailed information with respect to execution of the program by being executed together with another program as one of software tools. The office trust software monitor server 130 may receive the initial hash value with respect to the software installation region whenever the mobile terminal 110 installs the software.

The smart trust software monitor server 140 may be a server of managing one or more office trust software monitor servers 130. That is, the smart trust software monitor server 140 may mean a software monitor capable of managing a wide area. For example, the office trust software monitor server 130 may be assigned to each department of the enterprise and perform a function as the software monitor, and the smart trust software monitor server 140 may perform a function as a software monitor monitoring the entire enterprise.

The smart trust software monitor server 140 may compare the initial hash value with respect to the software installation region received by requesting it from the mobile terminal 110 and the initial hash value with respect to the software installation region which is received from the office trust software monitor server 130 and is previously stored by when performing the integrity verification of the software, and verify the integrity of the software installed on the mobile terminal 110 using the comparison result.

For example, when performing the integrity verification of the software of the mobile terminal 110 owned by employees in the enterprise, the smart trust software monitor server 140 may receive the initial hash value with respect to the software installation region by requesting it from the mobile terminal 110. The smart trust software monitor server 140 may verify the integrity of the software by comparing the initial hash value with respect to the software installation region of the mobile terminal 110 and the initial hash value with respect to the software installation region which is received from the office trust software monitor server 130 and is previously stored.

Figure 2:
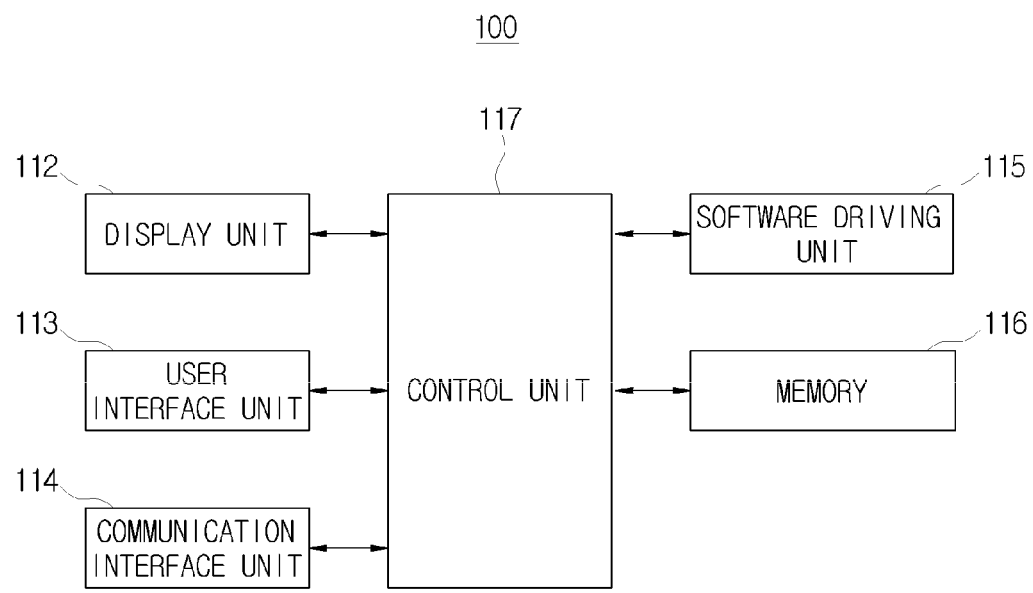
FIG. 2 is a diagram illustrating a configuration of a mobile terminal according to an embodiment of the present invention.
Figure 3:
FIG. 3 is a diagram illustrating a configuration of a memory of a mobile terminal according to an embodiment of the present invention.

Hereinafter, the mobile terminal 110 according to an embodiment of the present invention will be described in detail with reference to FIGS. 2 and 3. FIG. 2 is a diagram illustrating a configuration of a mobile terminal according to an embodiment of the present invention. FIG. 3 is a diagram illustrating a configuration of a memory of a mobile terminal according to an embodiment of the present invention.

As shown in FIG. 2, the mobile terminal 110 may include a display unit 112, a user interface unit 113, a communication interface unit 114, a software driving unit 115, a memory 116, and a control unit 117.

The display unit 112 may display various screens provided from the mobile terminal 110. For example, the display unit 112 may display various data objects and various user interface screens provided from the mobile terminal 110.

The user interface unit 113 may perform a function of receiving a user command. As one embodiment, the user interface unit 113 may be implemented as a button, and receive the user command. As another embodiment, the user interface unit 113 may be implemented as a touch pad, and receive the user command. At this time, the user interface unit 113 may be implemented as an integral form with the display unit 112.

The communication interface unit 114 may perform data communication with each of the office trust software monitor server 130 and the smart trust software monitor server 140. For example, the communication interface unit 114 may receive alarm information with respect to the result of the integrity verification of the software from the office trust software monitor server 130 and the smart trust software monitor server 140 through a network. Here, the network may be implemented by using various communication technologies such as Internet, local area network (LAN), wireless-fidelity (Wi-Fi), Ethernet, transmission control protocol/an Internet protocol (TCP/IP), internetwork packet exchange (IPX), FireWire, Institute of Electrical and Electronics Engineers (IEEE) 1394, iLink, code division multiple access (CDMA), time division multiple access (TDMA), Bluetooth, high definition multimedia interface-consumer electronics control (HDMI-CEC), wireless HDMI-CEC, radio frequency (RF), etc.

Further, the communication interface unit 114 may provide a path for downloading various software programs provided in the mobile terminal 110. At this time, a method in which the mobile terminal 110 communicates with the office trust software monitor server 130 and the smart trust software monitor server 140, and a method in which the mobile terminal 110 downloads the software may be the same or different.

The software driving unit 115 may drive and execute the software which the mobile terminal 110 itself can provide. Here, the software may include various multimedia contents as an application program capable of executing itself. At this time, a term "multimedia contents" may include a text, an audio, a still image, an animation, a video, interactivity contents, electronic program guide (EPG) contents from a content provider, an electronic message received from users, information with respect to a current event, control contents, etc. but is not limited thereto.

The memory 116 may be a storage medium in which various programs needed for operating the mobile terminal 110 are stored. For example, the memory 116 may be any suitable type of memory which unlimitedly includes a volatile memory such as a dynamic random access memory (DRAM) or a static random access memory (SRAM), a nonvolatile memory such as a read only memory (ROM) or a flash memory, a data storage device, for example, a magnetic disk storage device (for example, a hard disk drive (HDD)), a tape storage device, an optical storage device (for example, a compact disk (CD), a digital versatile disk (DVD), or other machine readable storage medium which are detachable, undetachable, volatile or nonvolatile.

Further, the memory 116 may mean a storage device capable of being connected to the mobile terminal 110. As an example of the storage device, there may be a smart media, a memory stick, a compact flash (CF) card, an extreme digital (XD) card, a multimedia card, etc. The memory 116 may store a conversion format capable of converting various alarm information with respect to the result of the integrity verification of the software transmitted from the office trust software monitor server 130 and the smart trust software monitor server 140 which can be supported in the mobile terminal 110 to correspond to a display format of the mobile terminal 110.

Moreover, the memory 116 may include a ROM for storing a program of performing an operation of the control unit 117 controlling overall operations of the mobile terminal 110. Further, the memory 116 may include a RAM for temporarily storing data according to the operation of the control unit 117. Moreover, the memory 116 may further include an electrically erasable and programmable ROM (EEPROM), etc. for storing various reference data.

Meanwhile, the mobile terminal 110 may receive various software from the network as described above, and receive the software from an external memory (not shown) and an internal memory (not shown). The internal memory (not shown) may include a computer memory, etc. such as a RAM, a flash memory, a ROM, but is not limited thereto. Similarly, the external memory (not shown) may include a HDD, a compact disk (CD) ROM, a memory card, a universal serial bus (USB) flash drive, etc., but is not limited thereto.

The memory 116 according to an embodiment of the present invention may store identification information, each operating state information, control screen information corresponding to each operating state of the office trust software monitor server 130 and the smart trust software monitor server 140. Further, the memory 116 may provide a control screen corresponding to states of the office trust software monitor server 130 and the smart trust software monitor server 140 based on the stored information.

Further, the memory 116 may store a program and various data and commands needed for driving the mobile terminal 110. For example, information with respect to the software installation region may be stored in the memory 116. Here, the information with respect to the software installation region may include the initial hash value H(SW_storage) with respect to the software installation region of the memory, an installation software hash value H(S/W) (a first software hash value), and a software ID IDs/w.

Meanwhile, as shown in FIG. 3, the memory 116 according to an embodiment of the present invention may be divided into a software installation region 116A in which a data value is not changed and a user data region 116B in which the data value is changed.

Software installation information which is data of which value is not changed may be stored in the software installation region 116A. Here, the software installation information may mean information in which the data value is not changed when the software is installed and used.

A software execution file, the initial hash value H(SW_Storage) with respect to the software installation region, mobile terminal information IDm, etc. may be included in the software installation information. Particularly, the initial hash value H(SW_Storage) with respect to the software installation region may include a value obtained by applying the hash function to data of the memory initial state of the software installation region of the terminal released from the enterprise.

The user data region 116B may store data of which value can be changed and stored whenever the software is used. Data stored in the user data region 116B may include user data (for example, a mobile terminal ID, a user ID) or software data (for example, a software ID (IDs/w), a software hash value H(S/W), etc.

Accordingly, the authentication and the integrity verification of the software installed on the mobile terminal 110 may be performed on the data stored in the software installation region 116A (for example, the initial hash value H(SW_Storage) with respect to the software installation region) in which the data value is not changed.

For example, the system of verifying the integrity of the software 100 according to an embodiment of the present invention may register the value obtained by applying the hash function to the data of the memory initial state with respect to the software installation region 116A of the mobile terminal 110 in the office trust software monitor server 130. The mobile terminal 110 in which the memory 116 is included may be released to the user. After this, the system of verifying the integrity of the software 100 according to an embodiment of the present invention may use the value obtained by applying the hash function to the data of the memory initial state with respect to the software installation region 116A registered in the office trust software monitor server 130 in order to verify the integrity of the software.

First Embodiment

Figure 4:
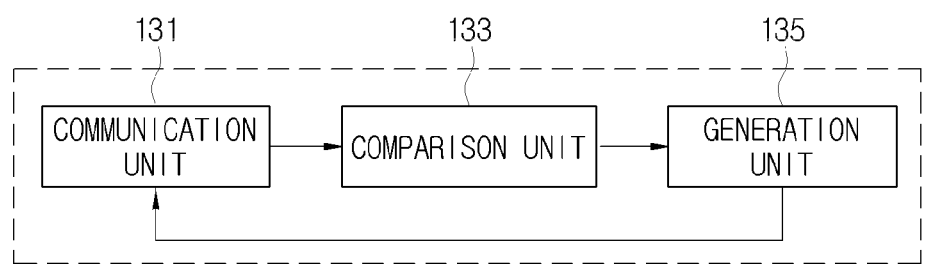
FIG. 4 is a diagram illustrating a configuration of an office trust software monitor server according to an embodiment of the present invention.

Hereinafter, a configuration of the office trust software monitor server 130 for verifying the integrity of the software of the mobile terminal 110 will be described with reference to FIG. 4. FIG. 4 is a diagram illustrating a configuration of an office trust software monitor server according to an embodiment of the present invention.

As shown in FIG. 4, the office trust software monitor server 130 may compare the software hash value H(S/W) (of a device) (the first software hash value) received from the mobile terminal 110 and the software hash value H(S/W) (of SPS) (the second software hash value) obtained from the software publishing server 120, and perform the authentication and the integrity verification of the software. For this, the office trust software monitor server 130 may include a communication unit 131, a comparison unit 133, and a generation unit 135.

The communication unit 131 may receive information such as the mobile terminal ID IDm, the initial hash value H(SW_Storage) with respect to the software installation region of the mobile terminal released from the system manager, etc. from the mobile terminal 110 which is managed by the system manager (for example, the enterprise). Further, the communication unit 131 may transmit the mobile terminal ID IDm to the software publishing server 120, and request the software authenticated by the system manager.

The comparison unit 133 may compare the software hash value H(S/W) (of the device) received from the mobile terminal 110 and the software hash value H(S/W) (of the SPS) received from the software publishing server 120.

The generation unit 135 may obtain the authentication and the integrity verification results of the software according to the comparison result of the two hash values H(S/W) of the device and H(S/W) of the SPS in the comparison unit 133.

When the two hash values H(S/W) of the device and H(S/W) of the SPS are not the same, the generation unit 135 may generate verification failure alarm information of the software.

When the two hash values H(S/W) of the device and H(S/W) of the SPS are the same, the generation unit 135 may generate verification success alarm information of the software. At this time, the mobile terminal information and the integrity verification result may be stored in a storage unit (not shown).

Further, the alarm information generated in the generation unit 135 may be transmitted to a corresponding mobile terminal 110 through the communication unit 131, and inform the user of the result of the integrity verification of the software.

Figure 5B:
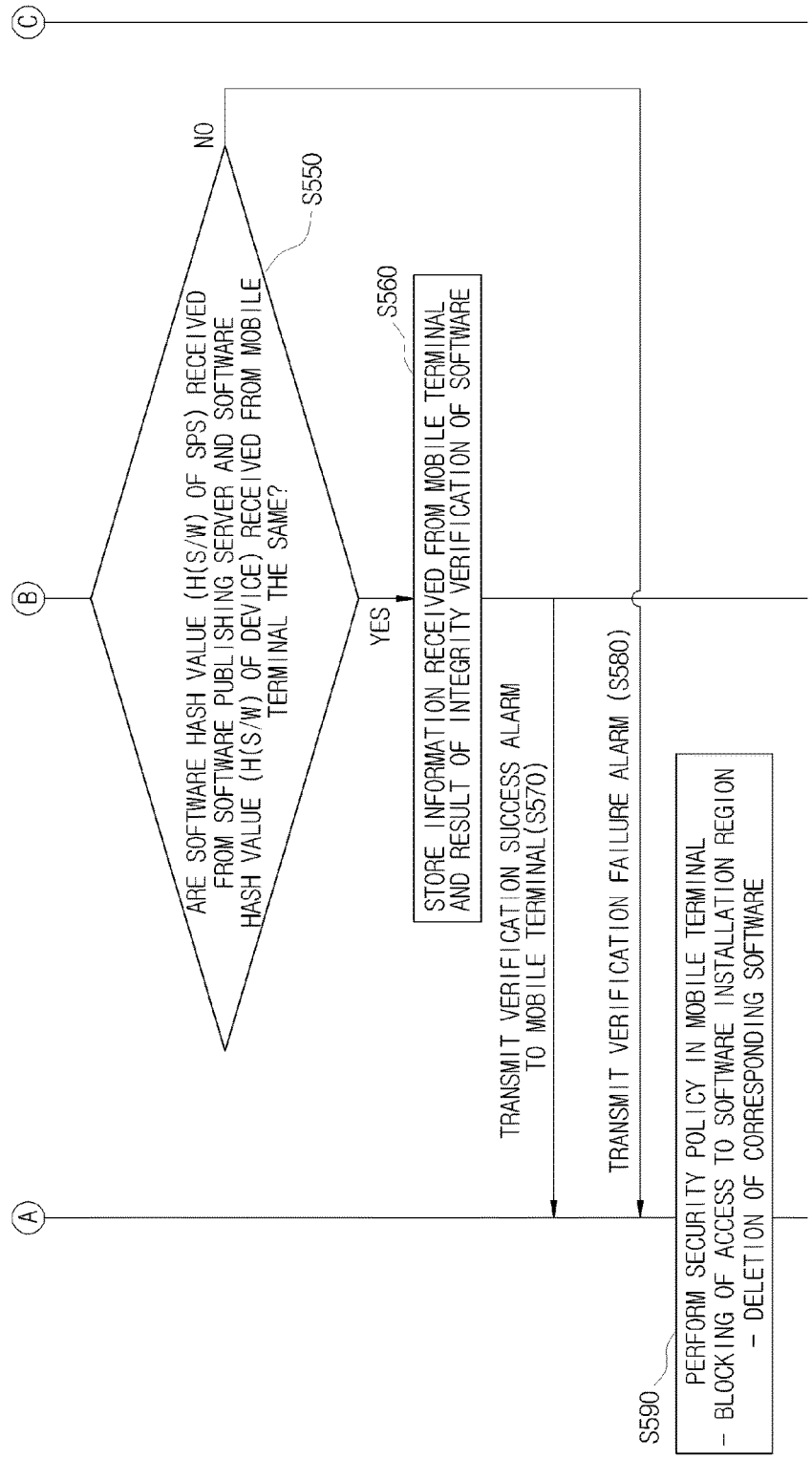

Hereinafter, an operation of verifying the integrity through the office trust software monitor server will be described in detail with reference to FIGS. 5A and 5B. FIGS. 5A and 5B are a flowchart for describing a method of verifying integrity of software in an office trust software monitor server according to an embodiment of the present invention.

The mobile terminal information may be transmitted from the mobile terminal 110 to the office trust software monitor server 130, and the mobile terminal 110 may be registered (S510). Here, the mobile terminal information may include the mobile terminal ID IDm of the mobile terminal 110 and the initial hash value H(SW_Storage) with respect to the software installation region 116A of the memory 116 in which the software is installed.

For example, one or more mobile terminals 110 managed in the enterprise may be registered through the office trust software monitor server 130 which is the software monitor of each department, and when being registered, information of the mobile terminal ID IDm and the initial hash value H(SW_Storage) with respect to the software installation region of the mobile terminal released from the enterprise may be transmitted to the office trust software monitor server 130.

After this, the registered mobile terminal 110 may transmit the mobile terminal ID IDm and the initial hash value H(SW_Storage) with respect to the software installation region of the memory in which the software is installed which are the mobile terminal information, and the software ID IDs/w and the software hash value H(S/W of the device), etc. which are software information to the office trust software monitor server 130 whenever new software is installed on the mobile terminal (S520).

The office trust software monitor server 130 may request related software from the software publishing server 120 using the software ID IDs/w received from the mobile terminal 110 (S530).

Accordingly, the software publishing server 120 may confirm the software ID IDs/w, and transmit information with respect to the requested corresponding software to the office trust software monitor server 130 (S540). At this time, the software publishing server 120 may transmit information including the software hash value H(S/W) (of the SPS) with respect to the corresponding software to the office trust software monitor server 130.

The office trust software monitor server 130 may compare the software hash value H(S/W) (of the SPS) (the second software hash value) received from the software publishing server 120 in the operation S540 and the software hash value H(S/W) (of the device) (the first software hash value) received from the mobile terminal 110 in the operation S520 (S550). Here, the office trust software monitor server 130 may verify the software by comparing the software hash value H(S/W) (of the SPS) received from the software publishing server 120 and the software hash value H(S/W) (of the device) received from the mobile terminal 110.

According to the comparison result of the operation S550, when the software hash value H(S/W) (of the SPS) received from the software publishing server 120 and the software hash value H(S/W) (of the device) received from the mobile terminal 110 are the same, the office trust software monitor server 130 may store the information (the mobile terminal ID IDm and the initial hash value H(SW_Storage) with respect to the software installation region of the memory in which the software is installed) received from the mobile terminal 110 and the result of the integrity verification of the software (the comparison result of the operation S550) (S560).

At this time, the office trust software monitor server 130 may generate the verification success alarm information when the two hash values H(S/W) of the SPS and H(S/W) of the device are the same.

The office trust software monitor server 130 may transmit the generated verification success alarm information to the mobile terminal 110 (S570).

According to the comparison result of the operation S550, when the software hash value H(S/W) (of the SPS) received from the software publishing server 120 and the software hash value H(S/W) (of the device) received from the mobile terminal 110 are not the same, the office trust software monitor server 130 may generate the verification failure alarm information, and transmit the generated verification failure alarm information to the mobile terminal 110 (S580). That is, when the two hash values H(S/W) of the SPS and H(S/W) of the device are not the same, the office trust software monitor server 130 may generate the verification failure alarm information.

The mobile terminal 110 receiving the verification failure alarm information may perform a security policy (S590). Here, the security policy may be a policy of preventing software unauthenticated by the system manager from being installed on the mobile terminal 110, and there may be the security policy such as deletion of the corresponding software, access limitation to the storage unit, etc.

When the integrity verification of the software is failed and the verification failure alarm information of the software is received, the mobile terminal 110 may be operated by various security policies. For example, when the integrity verification of the software installed on the mobile terminal 110 is failed, the corresponding software may be prevented from accessing the memory of the mobile terminal. Further, a predetermined security policy such as the deletion of the corresponding software (the software of which the integrity verification is failed) or the deletion of data of the corresponding software, etc. may be performed.

Further, the mobile terminal 110 may automatically transmit the initial hash value H(SW_Storage) with respect to the software installation region to the office trust software monitor server 130 by the number of times per a predetermined day (for example, one time per one day) regardless of the installation of the software, confirm the software installation region of the memory of the mobile terminal, and check whether malicious or unauthenticated software is installed.

Meanwhile, the system of verifying the integrity of the software according to another embodiment of the present invention may verify the integrity of the software installed on the mobile terminal 110 through the smart trust software monitor server 140. Here, the smart trust software monitor server 140 may be a software monitor capable of managing a wide area, and a software monitor capable of managing one or more office trust software monitor servers 130.

The smart trust software monitor server 140 may have a software monitor capable of managing the mobile terminal 110 registered by the system manager (for example, the enterprise) using more simplified data than when performing the integrity verification of the software through the office trust software monitor server 130. At this time, suppose that the smart trust software monitor server 140 has previously performed the authentication with respect to the office trust software monitor server 130 and the authentication with respect to the user.

Second Embodiment

Figure 6:
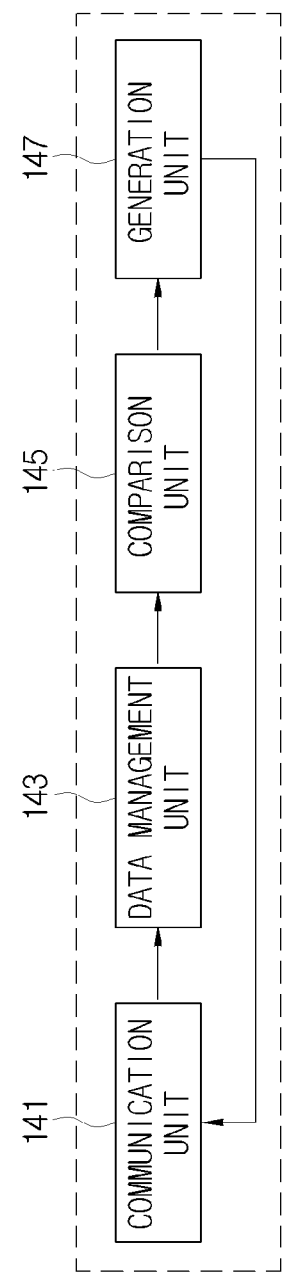
FIG. 6 is a diagram illustrating a configuration of a smart trust software monitor server according to an embodiment of the present invention.

Hereinafter, a Configuration of the Smart Trust Software Monitor Server 140 for the integrity verification of the software of the mobile terminal 110 will be described with reference to FIG. 6. FIG. 6 is a diagram illustrating a configuration of a smart trust software monitor server according to an embodiment of the present invention.

As shown in FIG. 6, the smart trust software monitor server 140 may include a communication unit 141, a data management unit 143, a comparison unit 145, and a generation unit 147.

The communication unit 141 of the smart trust software monitor server 140 may receive information provided from the mobile terminal 110 through the office trust software monitor server 130. Here, the information provided from the mobile terminal 110 may include the mobile terminal ID IDm, the initial hash value H(SW_Storage) with respect to the software installation region, the ID IDs/w and the hash value H(S/W) of the software installed on the mobile terminal.

At this time, the communication unit 141 may receive an ID $ID_{OTSMS}$ of the office trust software monitor server 130 provided from the office trust software monitor server 130 together with information provided from the mobile terminal 110.

The data management unit 143 may store the information received in the communication unit 141. At this time, the data management unit 143 may receive the information provided from the mobile terminal 110 through the communication unit 141 whenever new software is installed on the mobile terminal 110, and update the mobile terminal information which is previously stored. At this time, the mobile terminal information may be stored in a separate storage unit.

The data management unit 143 may request the integrity verification of the software of the mobile terminal 110 at a specific time while the mobile terminal information is repeatedly updated. At this time, the specific time requesting the integrity verification of the software may be a time in which the new software is installed on the mobile terminal 110. Alternatively, the integrity verification of the software may be requested every predetermined time or interval.

When the integrity verification of the software is requested by the data management unit 143, the communication unit 141 may request the initial hash value H(SW_Storage) with respect to the software installation region from the corresponding mobile terminal 110.

Here, data which the communication unit 141 receives from the mobile terminal 110 may include not only information for the integrity verification such as the mobile terminal ID IDm and the initial hash value H(SW_Storage) with respect to the software installation region of the mobile terminal but also a random value and a time stamp. Accordingly, the information received from the mobile terminal 110 may be information with respect to the software installation region SW_Storage of the mobile terminal of the time in which the integrity verification of the software is requested.

The comparison unit 145 may compare the initial hash value H(SW_Storage) (of STSMS) (the first initial hash value) with respect to the software installation region received from the office trust software monitor server 130 and previously stored in the data management unit 143 and the initial hash value H(SW_Storage) (of the device) (the second initial hash value) with respect to the software installation region received from the mobile terminal 110.

When the two initial hash values H(SW_Storage) of the STSMS and H(SW_Storage) of the device are the same according to the comparison result of the comparison unit 145, the generation unit 147 may determine that the integrity verification with respect to the software is succeeded, and store the result of the integrity verification (integrity verification success information) of the software. Further, the generation unit 147 may generate verification success alarm information, and transmit the generated verification success alarm information to the mobile terminal 110.

When the two initial hash values H(SW_Storage) of the STSMS and H(SW_Storage) of the device are not the same, the generation unit 147 may determine that the integrity verification with respect to the software is failed, and store the result of the integrity verification (integrity verification failure information) of the software of the mobile terminal 110.

Further, the generation unit 147 may generate verification failure alarm information, and transmit the generated verification failure alarm information to the mobile terminal 110.

Figure 7A:
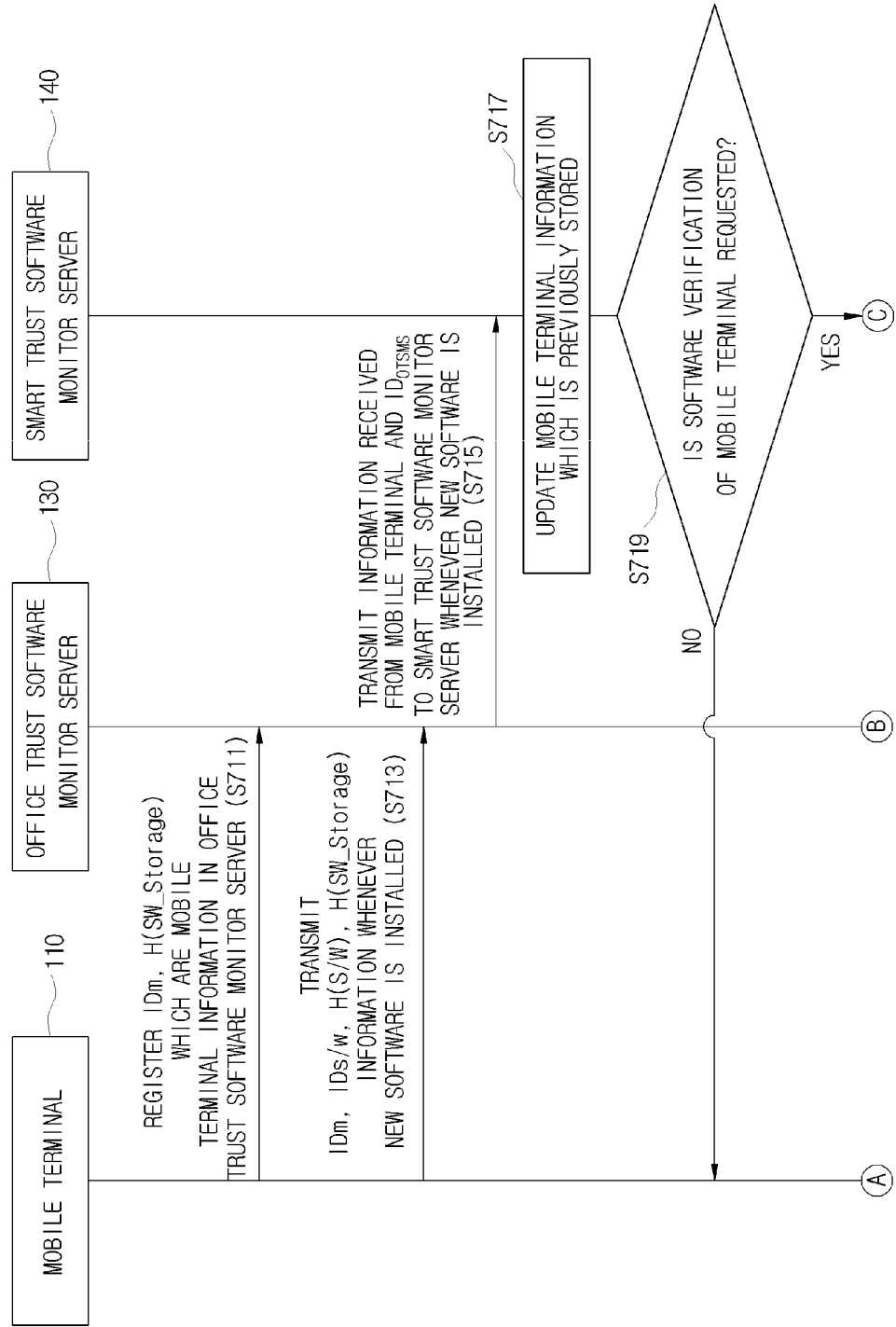
FIGS. 7A and 7B are a flowchart for describing a method of verifying software in a smart trust software monitor server according to an embodiment of the present invention.
Figure 7B:
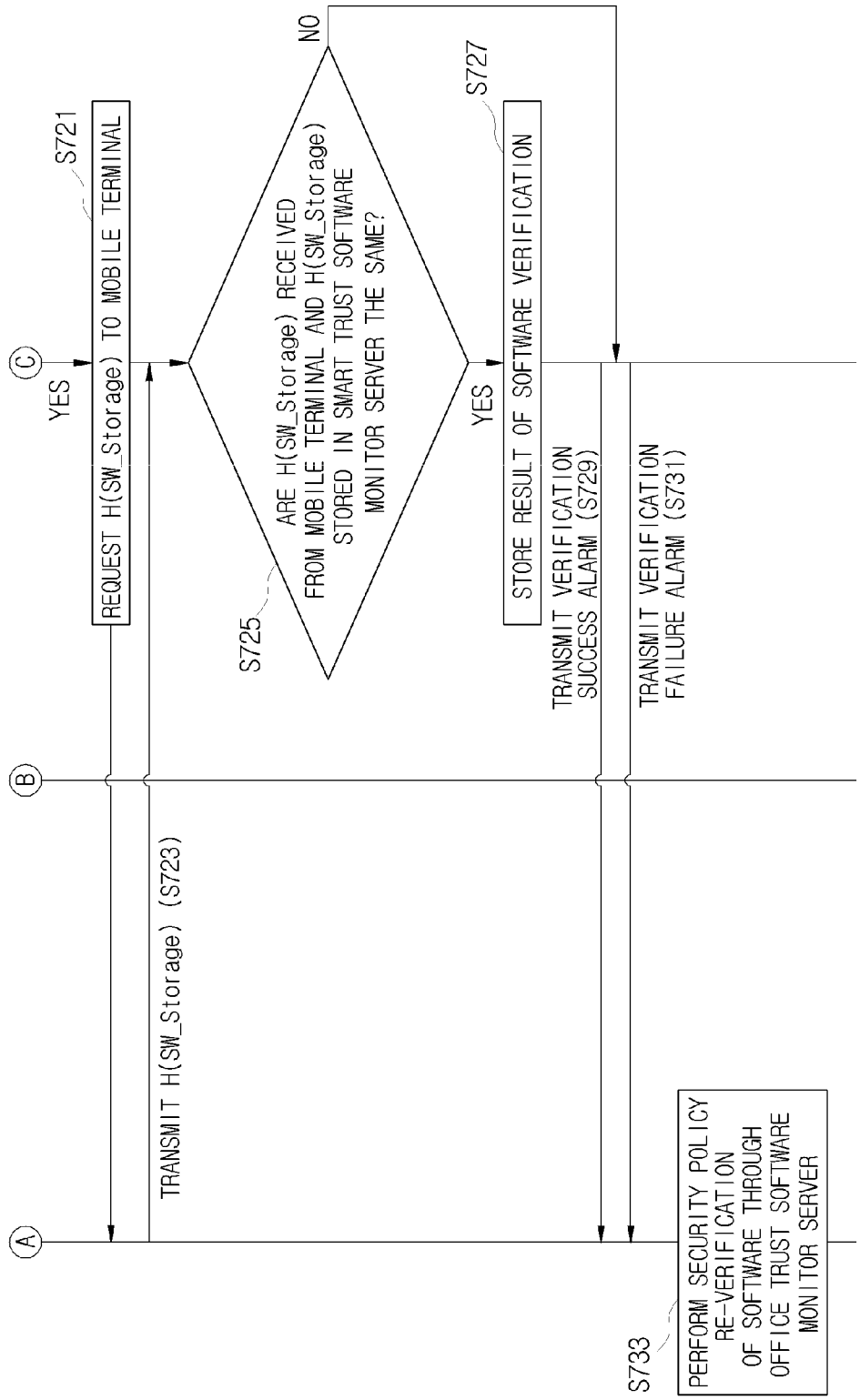

Hereinafter, an operation of verifying the integrity through the smart trust software monitor server 140 will be described in more detail with reference to FIGS. 7A and 7B. FIGS. 7A and 7B are a flowchart for describing a method of verifying software in a smart trust software monitor server according to an embodiment of the present invention.

The mobile terminal 110 may transmit the mobile terminal information including the mobile terminal ID IDm and the initial hash value H(SW_Storage) with respect to the software installation region of the mobile terminal to the office trust software monitor server 130, and register it therein (S711).

The mobile terminal 110 may transmit the ID IDm of the mobile terminal, the ID IDs/w of the software, the hash value H(S/W) of the software, and the initial hash value (H(SW_Storage) with respect to the software installation region to the office trust software monitor server 130 whenever new software is installed (S713).

The office trust software monitor server 130 may transmit information received from the mobile terminal 110 and its own ID $ID_{OTSMS}$ to the smart trust software monitor server 140 (S715).

The smart trust software monitor server 140 may update the mobile terminal information which is previously stored with the information received from the office trust software monitor server 130 in the operation S715 (S717).

While repeatedly updating the information of the mobile terminals, the smart trust software monitor server 140 may determine whether the integrity verification of the software is requested at a specific time (S719). At this time, the specific time of requesting the integrity verification of the software may be a time in which the new software is installed on the mobile terminal 110. Alternatively, the integrity verification of the software may be requested every previously predetermined time or interval.

When the smart trust software monitor server 140 does not request the integrity verification of the software of the mobile terminal 110, the mobile terminal 110 may perform the operation S713 of transmitting the ID IDm of the mobile terminal, the ID IDs/w of the software, the hash value H(S/W) of the software, and the initial hash value H(SW_Storage) with respect to the software installation region to the office trust software monitor server 130 whenever the new software is installed.

When the smart trust software monitor server 140 requests the integrity verification of the software of the mobile terminal 110, the smart trust software monitor server 140 may request the initial hash value H(SW_Storage) (of the device) with respect to the software installation region from the mobile terminal 110 (S721).

The mobile terminal 110 may transmit the mobile terminal information including the initial hash value H(SW_Storage) (of the device) with respect to the software installation region to the smart trust software monitor server 140 (S723). At this time, not only information for the integrity verification such as the ID IDm of the mobile terminal 110 and the initial hash value H(SW_Storage) with respect to the software installation region but also the random value and the time stamp may be included in the mobile terminal information. Accordingly, data received from the mobile terminal 110 may be information with respect to the software installation region SW_Storage of the mobile terminal 110 of the time in which the integrity verification of the software is requested.

The smart trust software monitor server 140 may compare the hash value H(SW_Storage) (of the device) with respect to the software installation region received from the mobile terminal 110 and the hash value H(SW_Storage) (of the STSMS) with the software installation region of the mobile terminal 110 which is previously stored (S725).

When the two hash values H(SW_Storage) of the device and H(SW_Storage) of the STSMS are the same according to the comparison result of the operation S725, the smart trust software monitor server 140 may determine that the integrity verification is succeeded, and store the result of the integrity verification of the software of a corresponding mobile terminal (S727).

After this, the smart trust software monitor server 140 may generate the verification success alarm information, and transmit the generated verification success alarm information to the mobile terminal 110 (S729).

When the two hash values H(SW_Storage) of the device and H(SW_Storage) of the STSMS are not the same according to the comparison result of the operation S725, the smart trust software monitor server 140 may transmit the verification failure alarm information to the mobile terminal 110 (S731).

The mobile terminal 110 which receives the verification failure alarm information from the smart trust software monitor server 140 may request re-verification of the software through the office trust software monitor server 130, or perform the security policy such as blocking of data (S733). Here, the security policy may be a policy for preventing the software which is not authenticated by the system manger from being installed on the mobile terminal 110, and there may be the security policy such as deletion of corresponding software, access limitation to the storage unit, etc.

For example, when the integrity verification of the software installed on the mobile terminal 110 is failed, the corresponding software may be prevented from accessing the memory of the mobile terminal. Further, a predetermined security policy such as deletion of the corresponding software (the software of which the integrity verification is failed) or deletion of data of the corresponding software, etc. may be performed.

Moreover, the mobile terminal 110 may transmit the initial hash value H(SW_Storage) with respect to the software installation region to the office trust software monitor server 130 by the number of times per a predetermined day (for example, one time per one day) regardless of the installation of the software, confirm the software installation region of the memory of the mobile terminal, and check whether malicious or unauthenticated software is installed.

Accordingly, the system of verifying the integrity of the software according to an embodiment of the present invention may perform the authentication and the integrity verification of the software by comparing the hash value of the software stored in the mobile terminal and the hash value of the software received from the software publishing server 120, and thus can eliminate the security threats of the mobile terminal and provide a more safe mobile service environment even when the software is changed.

According to the present invention, since the verified and authenticated software can be installed on the mobile terminals included in a specific group, a more safe mobile service environment can be provided to the user of the mobile terminal. Further, according to the present invention, unauthenticated access, use, exposure, change, destruction of the data stored in the mobile terminal can be prevented.

Figure 8:
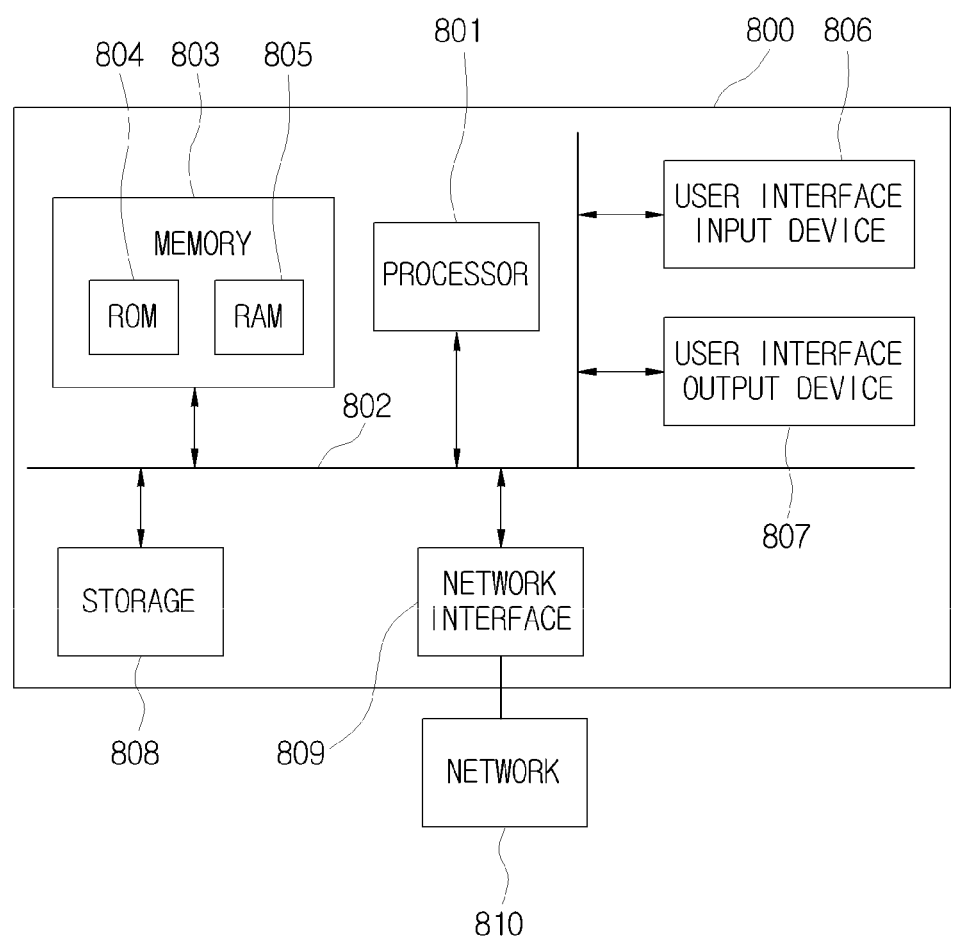
FIG. 8 is a block diagram illustrating a computer system for the present invention.

An embodiment of the present invention may be implemented in a computer system, e.g., as a computer readable medium. As shown in FIG. 8, a computer system 800 may include one or more of a processor 801, a memory 803, a user input device 806, a user output device 807, and a storage 808, each of which communicates through a bus 802. The computer system 800 may also include a network interface 809 that is coupled to a network 810. The processor 801 may be a central processing unit (CPU) or a semiconductor device that executes processing instructions stored in the memory 803 and/or the storage 808. The memory 803 and the storage 808 may include various forms of volatile or non-volatile storage media. For example, the memory may include a read-only memory (ROM) 804 and a random access memory (RAM) 805.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Further, according to the present invention, in order to provide a more safe mobile service environment to the user, since the authentication and the integrity verification of the software are performed using the initial hash value with respect to the software installation region of the memory of the mobile terminal, the security threats of the mobile terminal can be eliminated even when the software is changed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system of verifying integrity of software installed on a mobile terminal, the system comprising:
    the mobile terminal configured to:
        transmit mobile terminal information to an office trust software monitor server, the mobile terminal information including a first software hash value and a software identification (ID) with respect to the software,
        receive verification failure alarm information from a smart trust software monitor server, and
        perform a security policy in response to receiving the verification failure alarm information; the security policy including at least one of an operation of deleting the software and an operation of limiting access to a memory by the software,
        wherein the mobile terminal comprises a memory divided into a software installation region in which a data value is not changed and a user data region in which the data value is changed;
    the office trust software monitor server configured to:
        receive the mobile terminal information transmitted by the mobile terminal,
        transmit the software ID received from the mobile terminal to a software publishing server,
        receive a second software hash value with respect to the software corresponding to the software ID from the software publishing server as a response to transmitting the software ID to the software publishing server,
        compare the first software hash value and the second software hash value to produce a comparison result, and
        verify the integrity of the software using the comparison result;
    the smart trust software monitor server configured to manage a plurality of office trust software monitor servers in a wider area than an area managed by the office trust software monitor server, the plurality of office trust software monitor servers including the office trust software monitor server, wherein the smart trust software monitor is configured to:
        compare a first initial hash value with respect to the software installation region which is previously received from the office trust software monitor server and is previously stored and a second initial hash value with respect to the software installation region which is received from the mobile terminal at a specific time,
        verify the integrity of the mobile terminal by performing an integrity verification of the software, and
        transmit the verification failure alarm information to the mobile terminal in response to a failure of the integrity verification of the software,
    wherein the smart trust software monitor server comprises:
        a communication unit configured to repeatedly receive the mobile terminal information from the office trust software monitor server and an ID of the office trust software monitor server;
        a data management unit configured to update the previously stored mobile terminal information using the mobile terminal information received from the office trust software monitor server through the communication unit, and request the integrity verification of the software at the specific time;
        a comparison unit configured to compare the second initial hash value with respect to the software installation region received from the mobile terminal and the first initial hash value which is previously stored according to the request of the integrity verification of the software; and
        a generation unit configured to generate alarm information with respect to the result of the integrity verification according to the comparison result of the comparison unit.

2. The system of verifying the integrity of the software of claim 1, wherein the office trust software monitor server comprises:
    a communication unit configured to receive the mobile terminal information from the mobile terminal, and transmit the result of the integrity verification to the mobile terminal;

a comparison unit configured to compare the first software hash value and the second software hash value received through the communication unit to produce the comparison result; and a generation unit configured to generate alarm information with respect to the result of the integrity verification according to the comparison result of the comparison unit.

3. The system of verifying the integrity of the software of claim 2, wherein the generation unit determines that the integrity verification of the software is succeeded when the first software hash value and the second software hash value are the same according to the comparison result of the comparison unit, and determines that the integrity verification of the software is failed when the first software hash value and the second software hash value are not the same, and selectively generates verification success alarm information or verification failure alarm information according to the result of the integrity verification, and transmits the verification success alarm information or the verification failure alarm information to the mobile terminal through the communication unit.

4. The system of verifying the integrity of the software of claim 3, wherein the office trust software monitor server further comprises:

a storage unit configured to store the result of the integrity verification and the mobile terminal information when the integrity verification of the software is succeeded.

5. The system of verifying the integrity of the software of claim 1, wherein the mobile terminal information further comprises an initial hash value with respect to the software installation region which is a value obtained by applying a hash function to data of an initial state of the software installation region, and an ID of the mobile terminal.

6. The system of verifying the integrity of the software of claim 1, wherein the generation unit determines that the integrity verification of the software is succeeded when the first initial hash value and the second initial hash value are the same according to the comparison result of the comparison unit, and determines that the integrity verification of the software is failed when the first initial hash value and the second initial hash value are not the same, and selectively generates verification success alarm information or verification failure alarm information according to the result of the integrity verification and transmits the verification success alarm information or the verification failure alarm information to the mobile terminal through the communication unit.

7. A method of verifying integrity of software installed on a mobile terminal by an office trust software monitor server, the method comprising:

receiving, by the office trust software monitor server from the mobile terminal, mobile terminal information including a first software hash value and a software identification (ID) with respect to the software;

transmitting, by the office trust software monitor server, the software ID received from the mobile terminal to a software publishing server;

receiving, by the office trust software monitor server, from the software publishing server, a second software hash value with respect to the software corresponding to the software ID;

comparing, by the office trust software monitor server, the first software hash value and the second software hash value to produce a comparison result;

verifying, by the office trust software monitor server using the comparison result, the integrity of the software;

receiving, by a smart trust software monitor server from the office trust software monitor server, a first initial hash value with respect to a software installation region;

receiving, by the smart trust software monitor server from the mobile terminal, a second initial hash value with respect to the software installation region;

comparing, by the smart trust software monitor server, the first initial hash value and the second initial hash value;

transmitting, by the smart trust software monitor server to the mobile terminal, the verification failure alarm information to the mobile terminal when the first initial hash value and the second initial hash value are not the same; and performing, by the mobile terminal in response to receiving the verification failure alarm information, a security policy, the security policy including at least one of an operation of deleting the software and an operation of limiting access to a memory by the software, wherein the mobile terminal comprises a second memory divided into the software installation region in which a data value is not changed and a user data region in which the data value is changed, and wherein the verifying of the integrity comprises:

generating, by the office trust software monitor server, alarm information according to the comparison result of the first software hash value and the second software hash value, and transmitting the generated alarm information to the mobile terminal.

8. The method of verifying the integrity of the software of claim 7, wherein the generating of the alarm information determines that the integrity verification of the software is succeeded when the first software hash value and the second software hash value are the same according to the comparison result and generates verification success alarm information, and determines that the integrity verification of the software is failed when the first software hash value and the second software hash value are not the same and generates verification failure alarm information.

9. The method of verifying the integrity of the software of claim 8, further comprising:

storing, by the office trust software monitor server, the result of the integrity verification and the mobile terminal information when the integrity verification of the software is succeeded.

10. A method, performed by a smart trust software monitor server, of verifying integrity of software installed on a mobile terminal, the method comprising:

receiving, from an office trust software monitor server, an identification (ID) of the office trust software monitor server and mobile terminal information including a first initial hash value, the first initial hash value being obtained by applying a hash function to data of an initial state of a software installation region of the mobile terminal;

updating the mobile terminal information which is previously stored using the mobile terminal information which is repeatedly received from the office trust software monitor server;

transmitting, to the mobile terminal, a request for integrity verification of the software;

receiving, from the mobile terminal in response to the request of the integrity verification of the software, a second initial hash value with respect to the software installation region;

comparing the first initial hash value and the second initial hash value to produce a comparison result;

verifying the integrity of the software using the comparison result;

transmitting, to the mobile terminal, verification failure alarm information in response to a determination that the verification of the software is failed, wherein the verification failure alarm information indicates that the mobile terminal is to perform a security policy, the security policy including at least one of an operation of deleting the software and an operation of limiting access to a memory by the software, wherein the mobile terminal comprises a second memory divided into the software installation region in which a data value is not changed and a user data region in which the data value is changed, and wherein the verifying of the integrity comprises:

generating alarm information according to the comparison result of the first initial hash value and the second initial hash value; and transmitting the generated alarm information to the mobile terminal, the generated alarm information including one of the verification failure alarm information and verification failure alarm information.

11. The method of verifying the integrity of the software of claim 10, wherein the generating of the alarm information determines that the integrity verification of the software is succeeded when the first initial hash value and the second initial hash value are the same and generates the verification success alarm information, and determines that the integrity verification of the software is failed when the first initial hash value and the second initial hash value are not the same and generates the verification failure alarm information.

12. The method of verifying the integrity of the software of claim 11, further comprising:

storing the result of the integrity verification and the mobile terminal information when the integrity verification of the software is succeeded.

* * * * *